(12) United States Patent
Shinohara et al.

(10) Patent No.: US 10,099,728 B2
(45) Date of Patent: Oct. 16, 2018

(54) WORK VEHICLE

(71) Applicant: Kubota Corporation, Osaka-shi (JP)

(72) Inventors: Makoto Shinohara, Sakai (JP);
Yasunori Kobayashi, Sakai (JP);
Yoshihisa Tahara, Sakai (JP); Ryuichi Inoue, Sakai (JP)

(73) Assignee: Kubota Corporation, Osaka (JP)

( * ) Notice: Subject to any disclaimer, the term of this patent is extended or adjusted under 35 U.S.C. 154(b) by 180 days.

(21) Appl. No.: 15/172,506

(22) Filed: Jun. 3, 2016

(65) Prior Publication Data

US 2017/0036707 A1    Feb. 9, 2017

(30) Foreign Application Priority Data

Aug. 7, 2015  (JP) ................... 2015-157357
May 6, 2016   (JP) ................... 2016-093324

(51) Int. Cl.
*B62D 27/04*   (2006.01)
*B62D 33/06*   (2006.01)
*F16F 1/36*    (2006.01)

(52) U.S. Cl.
CPC ..... *B62D 33/0604* (2013.01); *B62D 33/0617* (2013.01); *F16F 1/36* (2013.01)

(58) Field of Classification Search
CPC . B62D 33/06; B62D 33/0604; B62D 33/0617
USPC .................................................. 296/190.07
See application file for complete search history.

(56) References Cited

U.S. PATENT DOCUMENTS

| 4,650,242 | A  | 3/1987  | Obe et al. |
| 6,450,473 | B1 | 9/2002  | Kondo et al. |
| 7,677,627 | B2 | 3/2010  | Aoyama et al. |
| 8,312,955 | B2 | 11/2012 | Kawashiri |
| 2010/0253115 | A1 | 10/2010 | Fukunaga et al. |

FOREIGN PATENT DOCUMENTS

| EP | 2380803 A1   | 10/2011 |
| GB | 2168656 A    | 6/1986  |
| JP | 2008143209 A | 6/2008  |

*Primary Examiner* — Hilary L Gutman
(74) *Attorney, Agent, or Firm* — The Webb Law Firm

(57) ABSTRACT

A work vehicle has a cabin supported via an anti-vibration member to a bracket that extends to a vehicle body outer side from a vehicle body frame. The bracket mounts a weight member. The weight member is attached to a position in the bracket, said position being located outward of the anti-vibration member, with the weight member protruding to the vehicle body outer side from the bracket.

13 Claims, 5 Drawing Sheets

WORK VEHICLE

CROSS-REFERENCE TO RELATED APPLICATIONS

This application claims priority to Japanese Patent Application Nos. 2015-157357 and 2016-093324, filed Aug. 7, 2015 and May 6, 2016, respectively, the disclosures of which are hereby incorporated in their entirety by reference.

TECHNICAL FIELD

The present invention relates to a work vehicle in which a cabin is supported via an anti-vibration member to a bracket that extends to a vehicle body outer side from a vehicle body frame.

BACKGROUND ART

As an example of work vehicle of the above-noted type, there is known a work vehicle disclosed in Patent Document 1. In the work vehicle disclosed in Patent Document 1, a cabin is mounted and supported via an anti-vibration member ("an anti-vibration rubber" in the document) to a bracket ("a cabin bracket" in the document) that extends to a vehicle body outer side from a vehicle body frame ("a clutch housing" in the document). At a leading end of the bracket, a weight member ("an anti-vibration weight" in the document) is provided. With this, the natural frequency of the bracket is adjusted by the weight member, thus reducing vibration to be transmitted to the cabin.

BACKGROUND ART DOCUMENT

Patent Document

[Patent Document 1] Japanese Unexamined Patent Application Publication No. 2008-143209

SUMMARY OF THE INVENTION

Problem to be Solved by Invention

With the above-described conventional work vehicle; however, depending on e.g. a structure of the cabin, the natural frequency of the bracket can be in inadvertent agreement with a space resonance frequency of the cabin or a vibrational frequency of the engine, so that increase of the vibration or noise in the cabin can sometimes occur. Thus, further improvement is desired.

Also, in the bracket, as vibration tends to be greater on the low-frequency side than on the high-frequency side across the natural frequency therebetween, vibration transmission of the anti-vibration member can not be reduced sufficiently in a frequency range on the lower frequency side than the natural frequency. For this reason, if the natural frequency of the bracket is too high, this results in extension of the frequency range where the vibration transmission of the anti-vibration member cannot be reduced sufficiently, thus inviting deterioration in the vibration or noise in the cabin.

In view of the above-described state of the art, there is a need for a work vehicle capable of reducing vibration to be transmitted to a cabin via a bracket.

Solution

A work vehicle in which a cabin is supported via an anti-vibration member to a bracket that extends to a vehicle body outer side from a vehicle body frame, wherein:

the bracket mounts a weight member; and the weight member is attached to a position in the bracket which position is on more outer vehicle body side than the anti-vibration member, with the weight member protruding to the vehicle body outer side from the bracket.

With the above characterizing feature, as the distance from the vehicle body frame to the weight member is made longer, the natural frequency of the bracket can be reduced without increasing the weight of the weight member. With this, by reducing the natural frequency of the bracket smaller than the space resonance frequency of the cabin or the vibrational frequency of the engine, the vibration to be transmitted to the cabin via the bracket can be reduced. Further, as the natural frequency of the bracket is made lower, vibration transmission of the anti-vibration member can be reduced sufficiently. In this respect too, the vibration to be transmitted to the cabin via the bracket can be reduced.

Further, in the present invention, preferably:

the bracket includes an attaching portion having an attaching face to which the weight member is to be attached; and the weight member is attached to the attaching face in such a manner that only a limited portion of a face thereof facing the attaching face is placed in contact with the attaching face.

Here, if the weight member were to be attached to the attaching face with an entire face thereof facing the attaching face being placed in contact with the attaching face, this would require high-accuracy working of the entire facing face, so that additional labor and cost would be required. On the other hand, with the above-described charactering feature, high accuracy working is needed for working only the limited portion of the face that faces the attaching face, so that working labor and cost can be reduced.

Further, in the present invention, preferably:

an area of a contacting portion of the facing face coming into contact with the attaching face is a half or less of an outer circumference area of the facing face as seen in a plan view.

With this characterizing feature, with minimization of the contacting portion, the working labor and cost can be effectively suppressed.

Further, in the present invention, preferably:

a contacting portion of the facing face coming into contact with the attaching face is disposed on more vehicle body outer side than a center of the weight member in an extending direction of the bracket.

With this characterizing feature, the fact that the contacting portion of the facing face coming into contact with the attaching face is disposed on more vehicle body outer side than a center of the weight member in an extending direction of the bracket means that the weight member is attached to the attaching face in a cantilever manner. With this, when the vehicle body vibrates in the vertical direction, the weight member vibrates about the contacting portion in a direction different from the vibrating direction (vertical direction) of the vehicle body (i.e. the horizontal component of the vibration of the weight member is increased). Therefore, vibration of the cabin can be effectively reduced.

Further, in the present invention, preferably:

a contacting portion of the facing face coming into contact with the attaching face is provided to protrude on the attaching face side.

With this characterizing feature, the contacting portion can be provided easily only by causing a portion of the facing face to protrude on the attaching face side.

Further, in the present invention, preferably:

the contacting portion of the facing face coming into contact with the attaching face is provided between widthwise opposed end portions of the facing face that extend perpendicularly to the extending direction of the bracket as seen in a plan view.

With this characterizing feature, when the contacting portion is placed in contact with the attaching face, no looseness will occur in the weight member in the width direction, and the weight member can be firmly attached to the attaching face.

Further, in the present invention, preferably:

in the vertical direction, an attaching position of the weight member relative to the attaching face is set to differ from an attaching position of the anti-vibration member relative to the bracket.

With this characterizing feature, as the attaching positions of the weight member and the anti-vibration member are not limited to a same position in the vertical direction, degree of freedom in the attaching positions of the weight member and the anti-vibration member can be improved.

Further, in the present invention, preferably:

the weight member is disposed to be overlapped with the anti-vibration member as seen in a plan view.

With this characterizing feature, while the weight member is attached to a position in the bracket which position is on more outer vehicle body side than the anti-vibration member, with the weight member protruding to the vehicle body outer side from the bracket, it is still possible to prevent the weight member from protruding on the vehicle body outer side excessively to be obstructive.

Further, in the present invention, preferably:

the bracket includes a protruding portion protruding from the bracket to the vehicle body outer side; and the weight member is attached to the protruding portion.

With this characterizing feature, in accordance with a length of the protruding portion, the distance from the vehicle body frame to the weight member is increased, so that the natural frequency of the bracket can be even further reduced.

Further, in the present invention, preferably:

the weight member is disposed at a center portion of the bracket in the width direction perpendicular to the extending direction of the bracket as seen in a plan view.

Incidentally, it is understood that the "center portion of the bracket in the width direction" is inclusive of an approximate center of the bracket in the width direction.

With this characterizing feature, the weight member is attached to the bracket with good width-wise weight balance, so that width-wise slanting of the bracket due to vibration or the like will occur less likely.

Further, in the present invention, preferably:

the bracket includes a top plate to which the anti-vibration is to be attached and a pair of side plates provided at the opposed end portions of the bracket in the width direction perpendicular to the extending direction of the bracket as seen in a plan view; and the side plates are formed to have a vertical length thereof progressively decreased toward the vehicle body outer side.

With this characterizing feature, the rigidity of the vehicle body frame side portion of the bracket (base end portion of the bracket) is increased and also the rigidity of the vehicle body outer side portion of the bracket (leading end portion of the bracket) is reduced. With this, it is possible to ensure required strength of the bracket with the increased rigidity of the bracket at its base end portion and also to reduce the natural frequency of the bracket with the lowered rigidity of the leading end portion of the bracket.

Further, in the present invention, preferably:

the bracket includes an abutment portion against which the cabin can abut.

With this characterizing feature, even when the cabin is vibrated, the abutment portion come into abutment against the cabin, so that displacement of the cabin can be prevented.

Further, in the present invention, preferably:

the abutment portion is disposed adjacent the weight member in the width direction perpendicular to the extending direction of the bracket as seen in a plan view.

With this characterizing feature, the abutment member can be provided in a compact manner at a position not interfering with the weight member.

EMBODIMENTS OF THE INVENTION

Embodiments of the present invention will be explained with reference to the accompanying drawings.

[General Configuration of Tractor]

Figure 1:
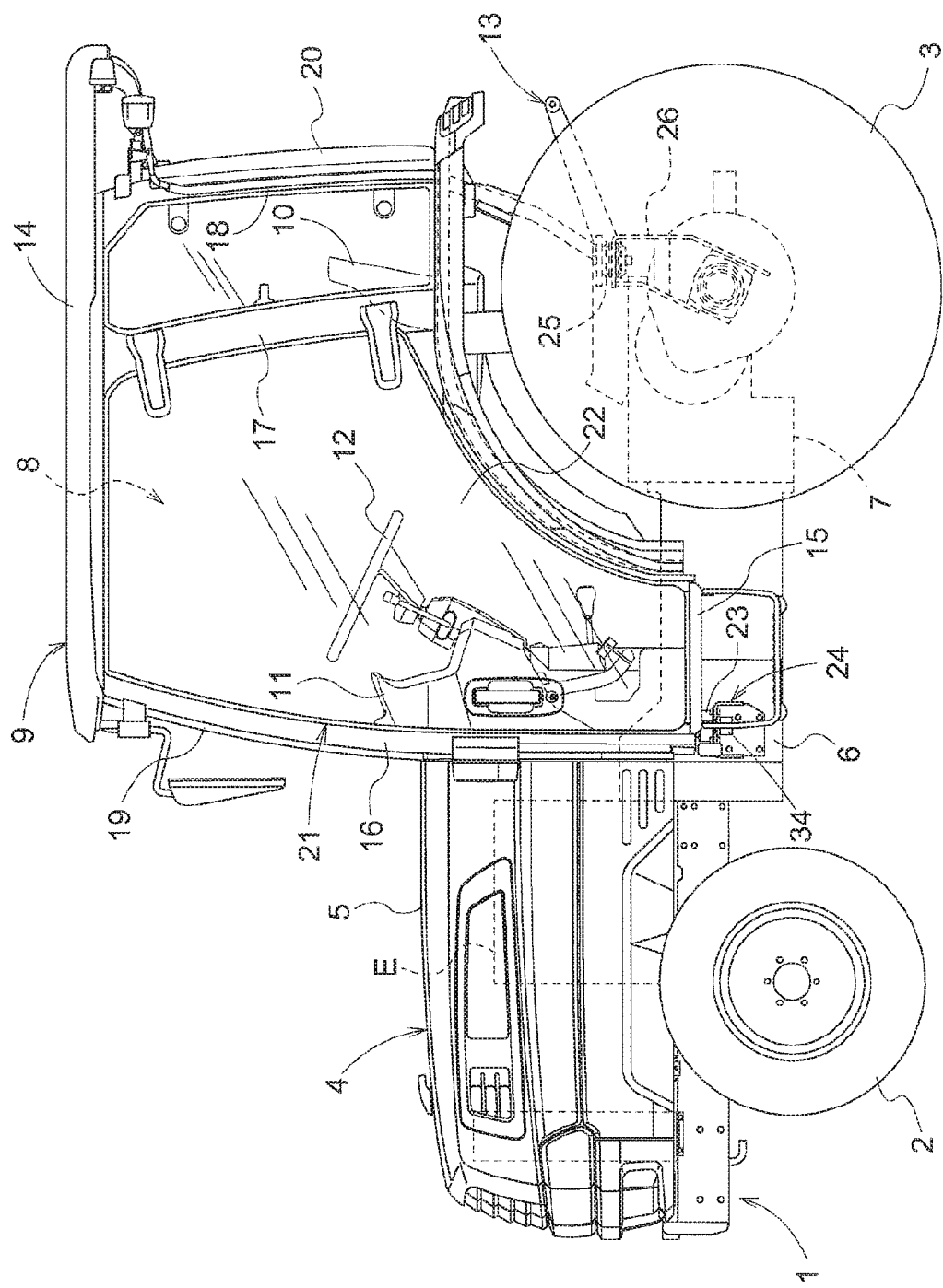
FIG. 1 is a left side view showing a tractor.

FIG. 1 shows a tractor as an example of "a work vehicle" relating to the present invention. This tractor includes a traveling vehicle body 1 of four-wheel driven type. The traveling vehicle body 1 includes a pair of left and right front wheels 2 that can be driven and steered and a pair of left and right rear wheels 3 that can be driven and braked.

In a front half portion of the traveling vehicle body 1, an engine section 4 is provided. This engine section 4 includes an engine E, etc., with the engine E, etc. being accommodated inside a hood 5. To a rear portion of the engine E, a clutch housing 6 (corresponding to "a vehicle body frame" relating to the present invention) is connected. To a rear portion of the clutch housing 6, a transmission case 7 is connected.

In a rear half portion of the traveling vehicle body 1, there are provided a driving section 8 and a cabin 9 covering the driving section 8. The driving section 8 includes a driver's seat 10, a front panel 11, a steering wheel 12, etc. To a rear end portion of the traveling vehicle body 1, an implement (not shown) such as a rotary cultivator or the like is mounted via a link mechanism 13 to be capable of lifting up/down and rolling actions.

[Cabin]

Figure 2:
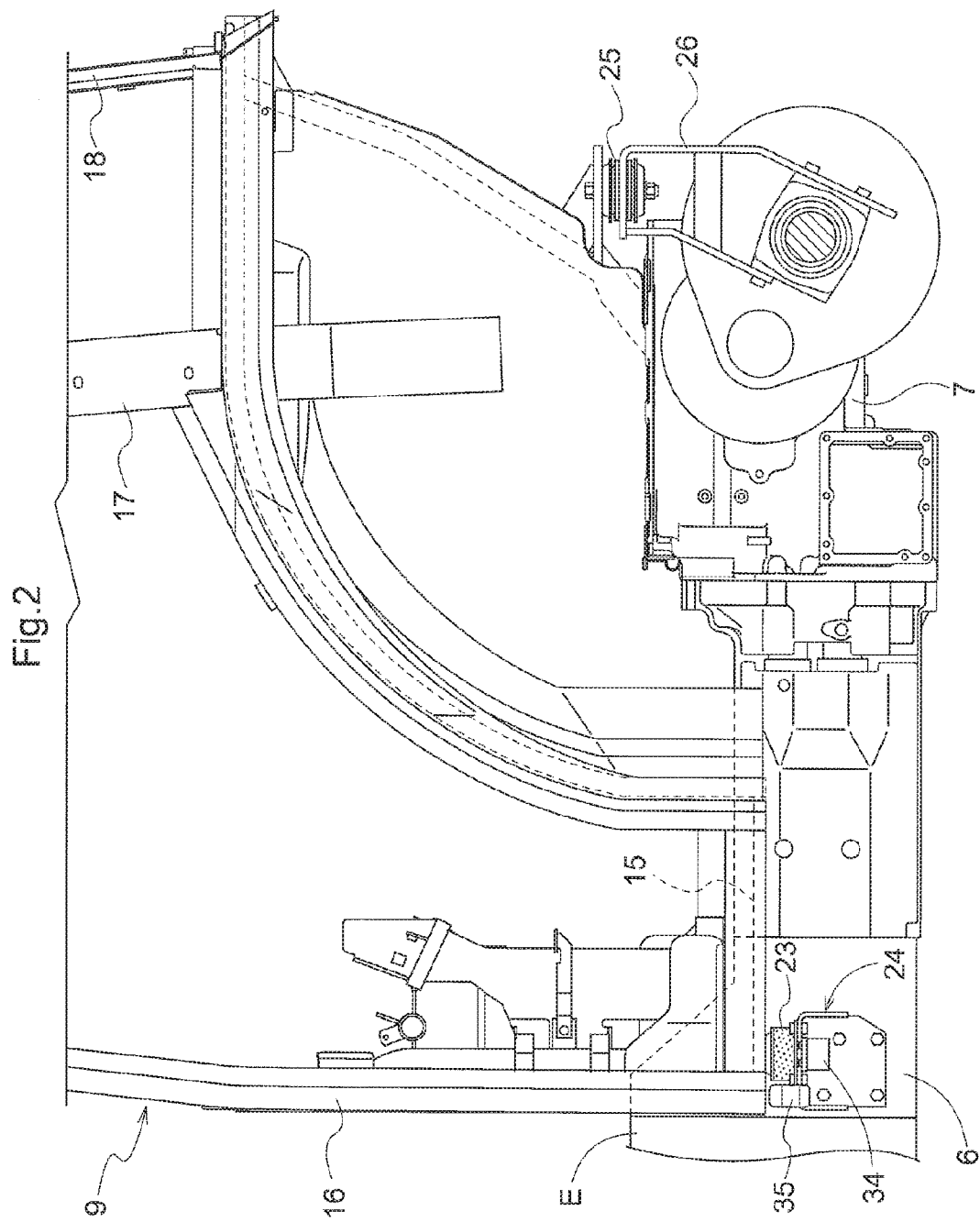
FIG. 2 is a left side view showing a supporting arrangement of a cabin.

As shown in FIG. 1 and FIG. 2, a roof of the cabin 9 is constituted of a roof portion 14. A floor of the cabin 9 is constituted of a floor panel 15. The roof portion 14 is supported by a pair of left and right front pillars 16, a pair of left and right side pillars 17 and a pair of left and right rear pillars 18.

At a front end portion and a rear end portion of the cabin 9, there are provided a front pane 19 and a rear pane 20, respectively. At the opposed lateral sides of the cabin 9, there are provided a door 21 and a side pane 22. The door 21 has its rear end portion supported to the side pillars 17 so that the door 21 can pivot about a vertically oriented axis to be opened and closed.

A front portion of the cabin 9 is mounted and supported to a pair of left and right front brackets 24 (corresponding to "a bracket" relating to the present invention) via a front anti-vibration rubber 23 (corresponding to "an anti-vibration member" relating to the present invention). A rear portion of the cabin 9 is mounted and supported to a pair of left and right rear brackets 26 via a rear anti-vibration rubber 25.

[Front Bracket]

Figure 3:
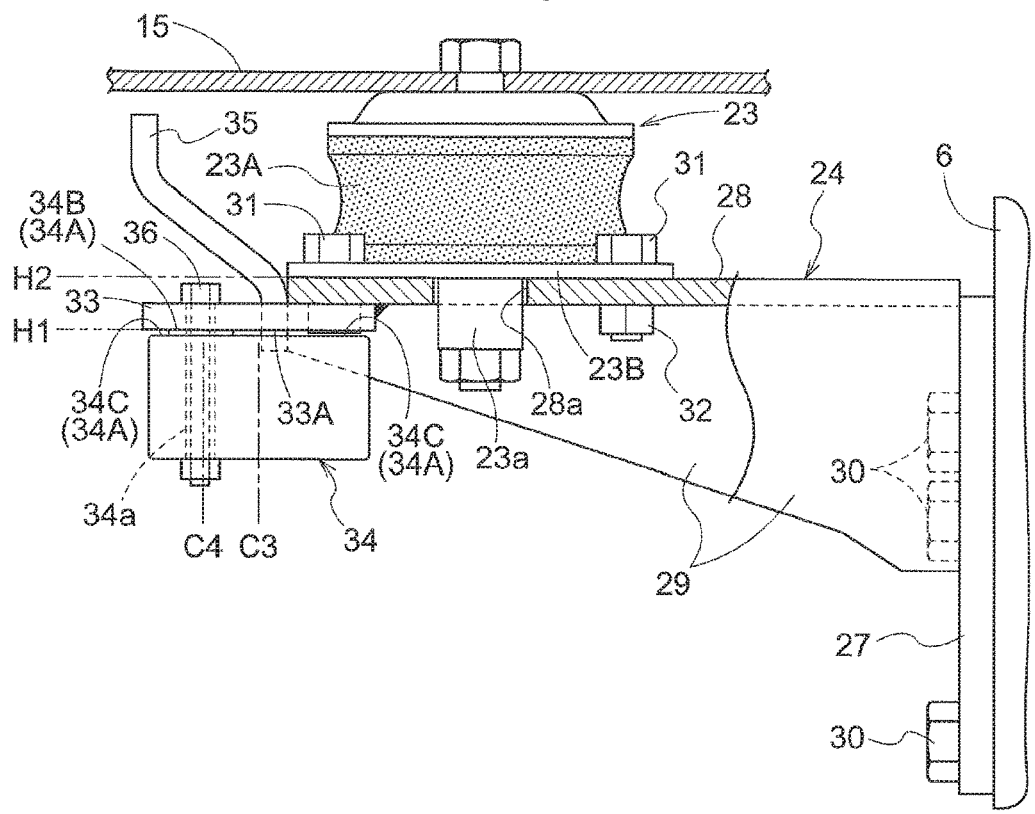
FIG. 3 is a rear view in section showing a front bracket.
Figure 4:
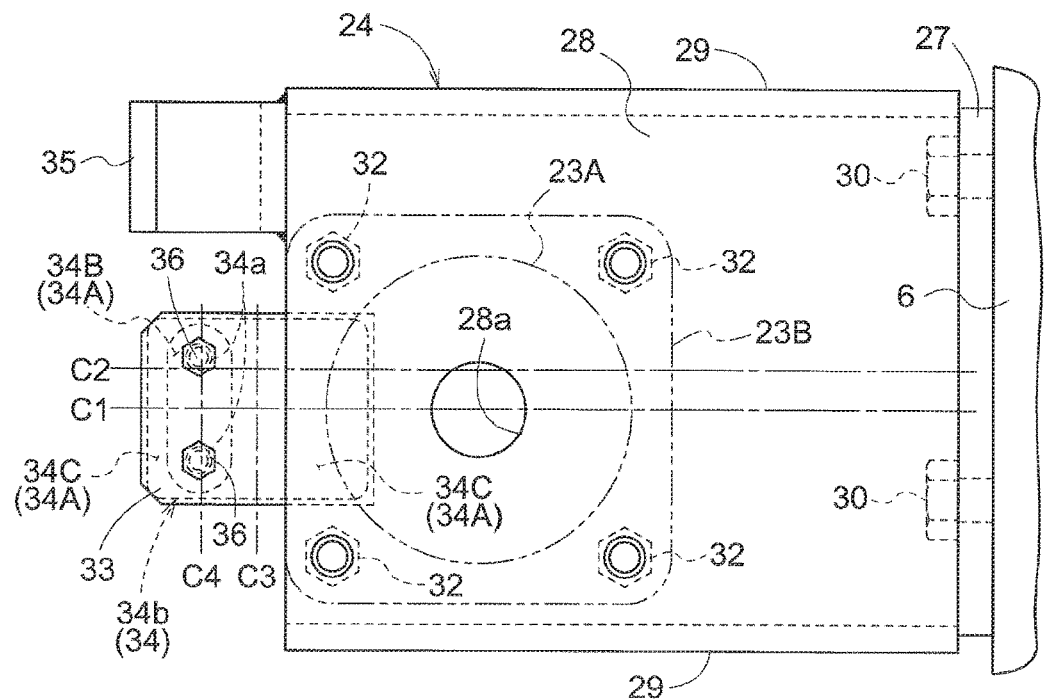
FIG. 4 is a bottom view showing the front bracket.
Figure 5:
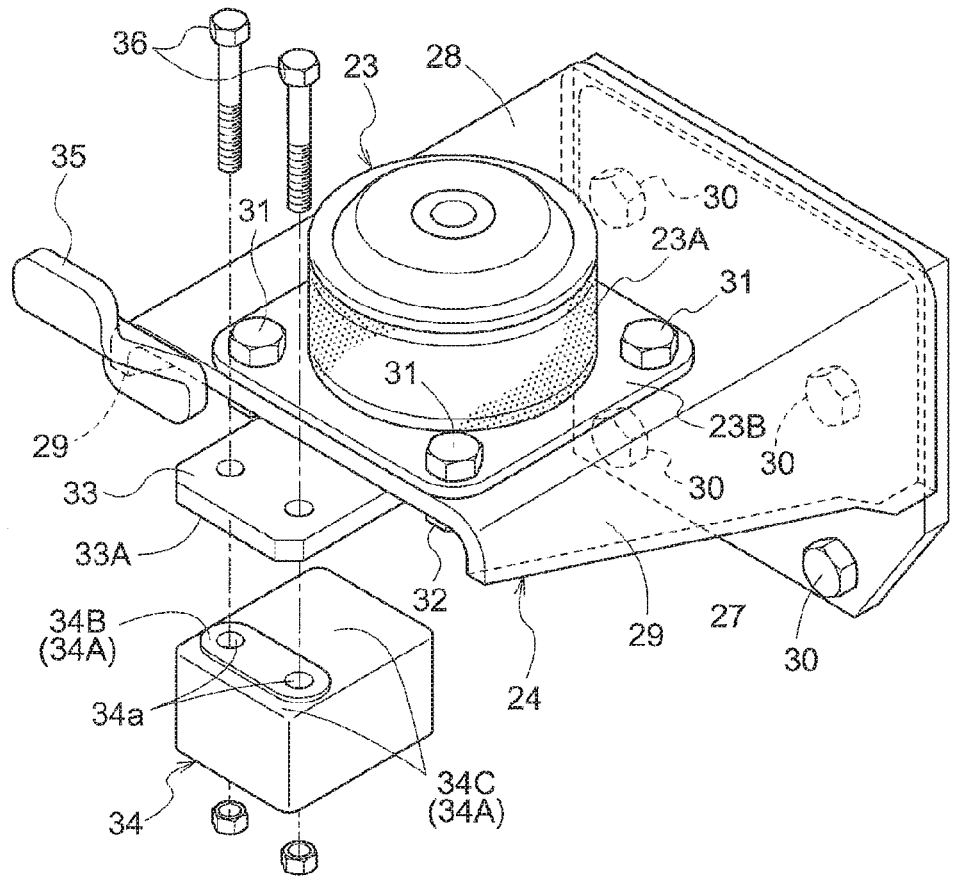
FIG. 5 is a perspective view showing the front bracket.
Figure 6:
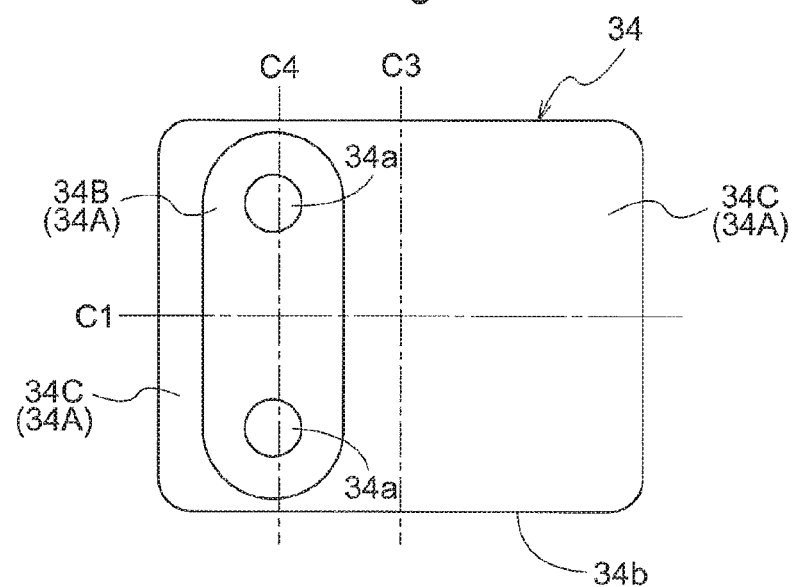
FIG. 6 is a plan view showing a weight.

As shown in FIGS. 3 through 5, the front bracket 24 extends to a vehicle body laterally outer side from the clutch housing 6. The front bracket 24 includes a fixed plate 27, a top plate 28 and a pair of side plates 29. The fixed plate 27 is fixed to a lateral portion of the clutch housing 6 by bolts 30. To the fixed plate 27, the top plate 28 and the pair of side plates 29 are fixed. The top plate 28 and the pair of side plates 29 are formed integrally by bending a plate-like member into an approximately portal shape.

In the top plate 28, at a portion thereof offset toward the vehicle body laterally outer side, there is formed a fit-in hole 28*a* into which the anti-vibration rubber 23 is to be fitted. To the lower face of the top plate 28, nuts 32 corresponding to the bolts 31 are fixed by welding.

The side plates 29 extend downward from the front/rear opposed end portions of the top plate 28. Each side plate 29 is formed with a lower side thereof being sloped upwards toward the vehicle body laterally outer side. Namely, the side plate 29 is formed such that its vertical length is progressively decreased toward the vehicle body laterally outer side.

[Front Anti-vibration Rubber]

The front anti-vibration rubber 23 is bolt-fixed to the floor panel 15. The front anti-vibration rubber 23 includes a main body portion 23A and a flange portion 23B. With a shaft portion 23*a* of the main body portion 23A being fitted into the fit-in hole 28*a*, the flange portion 28B is fixed to the top plate 28 with the bolts 31.

[Protruding Plate]

The front bracket 24 includes a protruding plate 33 (corresponding to "an attaching portion", "a protruding portion" relating to the present invention) protruding to the vehicle body laterally outer side from the front bracket 24. The protruding plate 33 is fixed to a portion of the lower face of the top plate 28 which portion is on more vehicle body laterally outer side than the fit-in hole 28*a*. The protruding plate 33 includes an attaching face 33A to which a weight 34 (corresponding to "a weight member" relating to the present invention) is to be attached. The attaching face 33A is formed in the lower face of the protruding plate 33.

[Abutment Plate]

The front bracket 24 includes an abutment plate 35 (corresponding to "an abutment portion" relating to the present invention). The abutment plate 35 can come into abutment against a lower portion (e.g. the floor panel 15) of the cabin 9. The abutment plate 35 is disposed adjacent the weight 34 on the front side and fixed to the vehicle body laterally outer side end of the front bracket 24. The abutment plate 35 is formed of a plate-like member bent in an approximately crank-like shape, with an upper end portion thereof being positioned on more vehicle body laterally outer side than a lower end portion thereof.

[Weight]

As may be understood from FIGS. 3 through 6, the weight 34 is formed of a block made of metal (e.g. lead). The weight 34 is fixed by bolts 36 to the lower face (attaching portion 33A) of the protruding plate 33, with the weight 34 protruding to the vehicle body laterally outer side from the front bracket 24. The weight 34 (protruding plate 33) is disposed at the approximately center portion of the front bracket 24 in a front/rear width direction thereof. Specifically, the weight 34 (protruding plate 33) is disposed at such a position that a front/rear center C1 of the weight 34 (protruding plate 33) is offset slightly toward the rear side relative to a front/rear center C2 of the front bracket 24.

In the weight 34, a pair of bolt holes 34*a* corresponding to the bolts 36 are formed at positions offset relative to a left/right center C3 of the weight 34. With this, the left/right position of the weight 34 relative to the front bracket 24 can be changed by attaching the weight 34 to the protruding plate 33 under a posture where the pair of bolt holes 34*a* are disposed on the vehicle body laterally outer side or by attaching the weight 34 to the protruding plate 33 under a posture where the pair of bolt holes 34*a* are disposed on the vehicle body laterally inner side.

The weight 34 is attached to the attaching face 33A, with only a limited portion (contacting portion 34B) of the facing face 34A facing the attaching face 33A being place in contact with this attaching face 33A. In the attaching face 34A, there are formed the contacting portion 34B of the facing face 34A coming into contact with the attaching face 33A and a non-contacting portion 34C of the facing face 34A not coming into contact with the attaching face 33A. The contacting portion 34B is provided to protrude toward the attaching face 33A side along the front/rear opposed end portions of the facing face 34A.

As seen in a direction perpendicular to the facing face 34A (as seen in a plan view), the area of the contacting portion 34B is a half or less of an outer circumference area of the 34A. In this case, as seen in the plan view, preferably, the area of the contacting portion 34B is 3/4 or less of the outer circumference area of the facing face 34A. Here, it is understood that the language "the outer circumference area of the facing face 34A" refers to the area surrounded by an outer edge 34*b* as seen in the plan view.

The contacting area 34B is disposed on more vehicle body outer side than the left/right center C3 (corresponding to the "center of the weight member in the extending direction of the bracket" relating to the present invention) of the weight 34. In this case, preferably, the contacting portion 34B is disposed on more vehicle body outer side than a center C4 between the left/right center C3 of the weight 34 and the vehicle body outer end of the weight 34.

In the vertical direction, an attaching position H1 of the weight 34 relative to the attaching face 33A is set at a different position than an attaching position H2 of the front anti-vibration rubber 23 (flange portion 23B) relative to the front bracket 24 (top plate 28). In this embodiment, in the vertical direction, the attaching position H1 is set at a position lower than the attaching position H2.

The weight 34 is provided to be overlapped with the main body portion 23A and the flange portion 23B in the front anti-vibration rubber 23 as seen in a plan view. In this case, preferably, as seen in the plan view, a 1/10 to 1/4 portion of the area surrounded by the outer edge 34*b* is overlapped with the main body portion 23A of the front anti-vibration rubber 23. Still preferably, a 1/7 to 1/5 portion of the area surrounded by the outer edge 34*b* is overlapped with the main body portion 23A of the front anti-vibration rubber 23.

[Relation Between Response Acceleration and Frequency of Front Bracket]

Figure 7:
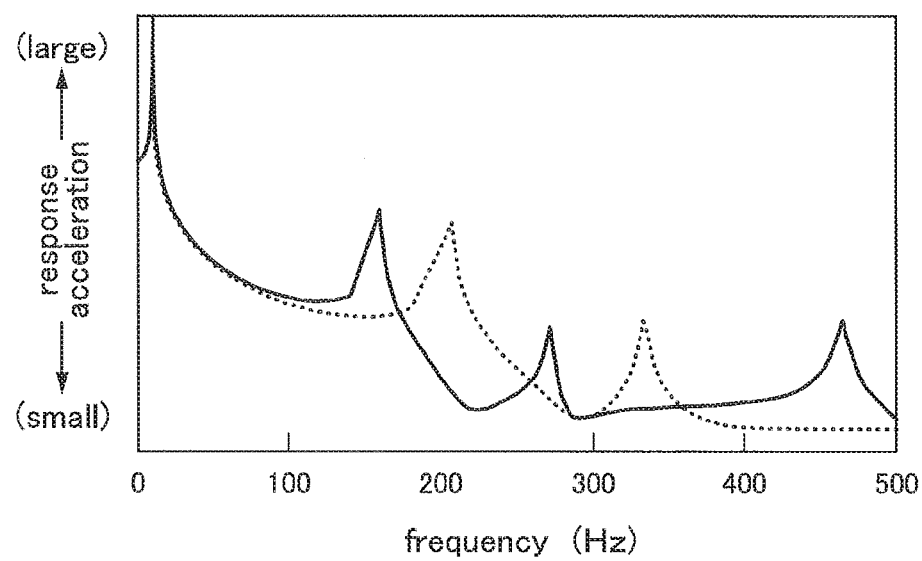
FIG. 7 is a graph showing a relation between a response acceleration and a frequency of the front bracket.

In FIG. 7, the horizontal axis represents the frequency (Hz) and the vertical axis represents the response acceleration of the front bracket 24. Further, in FIG. 7, the solid line is a line plotting response accelerations for respective frequencies of the front bracket 24, whereas the dotted line is a line plotting response accelerations for respective frequencies of a conventional bracket.

Here, as shown in FIG. 7, it is known that the space resonance frequency of the cabin 9 and the vibrational frequency of the engine E generally range from 180 to 200 Hz. And, with the conventional bracket, the natural frequency resides around 200 Hz and with agreement between the natural frequency of the bracket and the space resonance frequency of the cabin 9 or the vibrational frequency of the engine E, amplification of the vibration or noise in the cabin 9 can sometimes happen.

Further, as shown in FIG. 7, with the conventional bracket, there is a tendency of the response acceleration (vibration) being greater on the low frequency side than on the high frequency side, across its natural frequency of 200 Hz. And, in the frequency range on the lower frequency side than the natural frequency 200 Hz, vibration transmission of the anti-vibration member cannot be suppressed sufficiently.

On the other hand, with the front bracket 24, the natural frequency thereof is set adjacent 150 Hz. Thus, by reducing the natural frequency of the front bracket 24 lower than the space resonance frequency of the cabin 9 or the vibrational frequency of the engine E, it is possible to reduce vibration transmitted to the cabin 9 via the front bracket 24. Further, as a result of the natural frequency being lower than the natural vibrational frequency of the conventional bracket, the vibration transmission of the front anti-vibration rubber 23 can be reduced sufficiently. In this respect too, the vibration to be transmitted to the cabin 9 via the front bracket 24 can be suppressed.

[Other Embodiments]

(1) In the foregoing embodiment, the protruding plate 33 is fixed to the top plate 28. However, the present invention is not limited thereto. For instance, an elongate hole (not shown) can be formed in the protruding plate 33 or the top plate 28, so that with bolt-fixing of the protruding plate 33 to the top plate 28 via this elongate hole, the position of the protruding plate 33 can be made adjustable in either the front/rear direction or the left/right direction or both of these directions. Further, in another embodiment, the weight 34 can be directly attached to the front bracket 24, without the protruding plate 33 therebetween.

(2) In the foregoing embodiment, the weight 34 is attached to the front bracket 24. Instead of this or in addition to this, the weight 34 can be attached to the rear bracket 26. In this case, the weight 34 can be attached to a position of the rear bracket 26 which position is on more vehicle body laterally outer side than the rear anti-vibration rubber 25, with the weight 24 protruding toward the vehicle body laterally outer side from the rear bracket 26.

(3) In the foregoing embodiment, the weight 34 (protruding plate 33) is disposed at such position that the front/rear center C2 of the weight 34 (protruding plate 33) is slightly offset toward the rear side relative to the front/rear center C2 of the front bracket 24. However, the present invention is not limited thereto.

For instance, the weight 34 (protruding plate 33) can be disposed at such position where its front/rear center C1 is in agreement with the front/rear center C2 of the front bracket 24, that is, at the center of the front bracket 24 in the front/rear width direction thereof. Or, it can be disposed at such position where its front/rear center C1 is slightly offset toward the front side relative to the front/rear center C2 of the front bracket 24. Further alternatively, the weight 34 (protruding plate 33) can be disposed at the front end portion or the rear end portion of the front bracket 24 in the front/rear width direction.

(4) In the foregoing embodiment, the side plates 29 are formed with the vertical length thereof progressively decreased toward the vehicle body laterally outer side. Instead, the side plates 29 can be formed such that the vertical length thereof remains same.

(5) In the foregoing embodiment, the abutment plate 35 is provided adjacent on the front side relative to the weight 34. Instead, the abutment plate 35 can be provided adjacent on the rear side relative to the weight 34. Further alternatively, the abutment plate 35 can be omitted entirely.

(7) In the foregoing embodiment, the contacting portion 34B is disposed on more vehicle body outer side than the left/right center C3 of the weight 34. Instead, it can be disposed on more vehicle body inner side than the left/right center C3 of the weight 34. Further alternatively, it can be disposed on the left/right center C3 of the weight 34.

(8) In the foregoing embodiment, in the vertical direction, the attaching position H1 is set at a position lower than the attaching position H2. Instead, the attaching position H1 can be set at a position higher than the attaching position H2. Further alternatively, the attaching position H1 and the attaching position H2 can be set at a same position.

(9) In the foregoing embodiment, the weight 34 is disposed to be overlapped with the main body portion 23A and the flange portion 23B of the front anti-vibration rubber 23 as seen in the plan view. Instead, it can be disposed to be overlapped with only the flange portion 23B of the front anti-vibration rubber 23 as seen in the plan view. Further alternatively, it can be disposed not to be overlapped with the front anti-vibration rubber 23 at all as seen in the plan view.

INDUSTRIAL APPLICABILITY

The present invention is applicable not only to a tractor having a cabin, but also to a combine having a cabin.

DESCRIPTION OF REFERENCE NUMERALS/MARKS

6: clutch housing (vehicle body frame)
9: cabin
23: front anti-vibration rubber (anti-vibration member)
24: front bracket (bracket)
28: top plate
29: side plate
33: protruding plate (attaching portion, protruding portion)
33A: attaching face
34: weight (weight member)
34A: facing face
34B: contacting portion
35: abutment plate (abutment portion)
C3: left/right center of weight (center of weight member in extending direction of bracket)
H1: attaching position (attaching position of weight member relative to attaching face)
H2: attaching position (attaching position of anti-vibration member relative to bracket).

The invention claimed is:
1. A work vehicle in which a cabin is supported via an anti-vibration member to a bracket that extends to a vehicle body outer side from a vehicle body frame, wherein:
the bracket mounts a weight member; and the weight member is attached to a position in the bracket, said position being located outward of the anti-vibration member in a vehicle width direction from a central longitudinal axis of the vehicle, with the weight member protruding outwardly from the bracket in the vehicle width direction.

2. The work vehicle according to claim 1, wherein:
the bracket includes an attaching portion having an attaching face to which the weight member is to be attached; and
the weight member is attached to the attaching face in such a manner that only a limited portion of a face thereof facing the attaching face is placed in contact with the attaching face.

3. The work vehicle according to claim 2, wherein an area of a contacting portion of the facing face coming into contact with the attaching face is a half or less of an outer circumference area of the facing face as seen in a plan view.

4. The work vehicle according to claim 2, wherein a contacting portion of the facing face coming into contact with the attaching face is disposed further outward in the vehicle width direction relative to a center of the weight member in an extending direction of the bracket.

5. The work vehicle according to claim 2, wherein a contacting portion of the facing face coming into contact with an attaching face is provided to protrude on the attaching face side.

6. The work vehicle according to claim 2, wherein the contacting portion of the facing face coming into contact with the attaching face is provided between width-wise opposed end portions of the facing face that extend perpendicularly to the extending direction of the bracket as seen in a plan view.

7. The work vehicle according to claim 2, wherein in the vertical direction, an attaching position of the weight member relative to the attaching face is different from an attaching position of the anti-vibration member relative to the bracket.

8. The work vehicle according to claim 1, wherein the weight member is disposed to be overlapped with the anti-vibration member as seen in a plan view.

9. The work vehicle according to claim 1, wherein:
the bracket includes a protruding portion protruding from the bracket to the vehicle body outer side; and
the weight member is attached to the protruding portion.

10. The work vehicle according to claim 1, wherein the weight member is disposed at a center portion of the bracket in the width direction perpendicular to the extending direction of the bracket as seen in a plan view.

11. The work vehicle according to claim 1, wherein:
the bracket includes a top plate to which the anti-vibration member is to be attached and a pair of side plates provided at the opposed end portions of the bracket in the width direction perpendicular to an extending direction of the bracket as seen in a plan view; and
the side plates are formed to have a vertical length thereof progressively decreased toward the vehicle body outer side.

12. The work vehicle according to claim 1, wherein the bracket includes an abutment portion against which the cabin can abut.

13. The work vehicle according to claim 12, wherein the abutment portion is disposed adjacent the weight member in the width direction perpendicular to an extending direction of the bracket as seen in a plan view.

* * * * *